June 4, 1957 G. ROSIER 2,794,911

CIRCUIT ARRANGEMENT FOR REDUCING THE EFFECT OF UNDESIRED COMPONENTS IN A TELEVISION SIGNAL

Filed May 5, 1954

INVENTOR
GERARDUS ROSIER

BY [signature]

AGENT

United States Patent Office 2,794,911

Patented June 4, 1957

2,794,911

CIRCUIT ARRANGEMENT FOR REDUCING THE EFFECT OF UNDESIRED COMPONENTS IN A TELEVISION SIGNAL

Gerardus Rosier, Hilversum, Netherlands, assignor, by mesne assignments, to North American Philips Company, Inc., New York, N. Y., a corporation of Delaware Application May 5, 1954, Serial No. 427,788

Claims priority, application Netherlands May 18, 1953

4 Claims. (Cl. 250—20)

Figures 1, 2, 3, 4, 5, 6, 7, 8, 9:
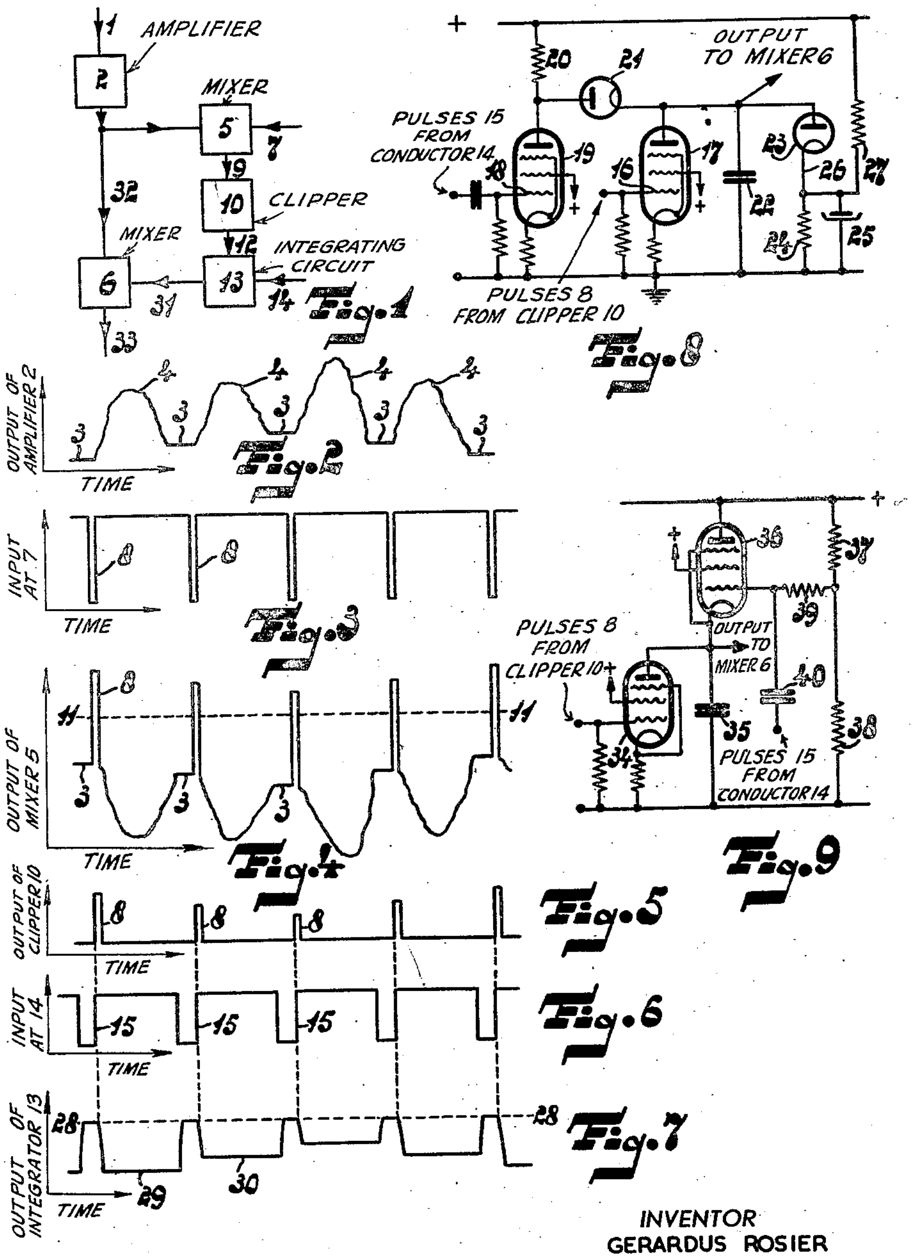

The invention relates to a circuit arrangement for reducing the effect of undesired components in a television signal, which signal contains a reference level corresponding to a constant level and occurring during periodic intervals.

It is known that, if no particular measures are taken, the output signal of a camera tube contains undesired components due to various causes which are irrelevant in this case. In order to minimize the unwanted components provisions are frequently made to have the output signal contain a periodic reference level corresponding to a constant level, for example the black level. To this end the tube is provided for example with a black ribbon which is scanned periodically, for example at the beginning or at the end of a line. Then the output signal of the camera tube is usually fed to a device with the aid of which this reference level gains a constant potential. It is true that in this way various unwanted components are substantially suppressed, but there is still the disadvantage that noise is produced during the occurrence of the reference level, which disturbs the fixation of the reference level on a constant potential.

The circuit arrangement according to the invention has for its object to reduce also this disadvantage and has the feature that the signal is combined with a periodic, pulsatory signal occurring only during at least part of the said time intervals and having a constant amplitude, the combined signal being integrated after the image component of the television signal has been cut off by amplitude selection, the integrated signal being combined with the television signal in phase opposition to the unwanted components.

The invention will now be described with reference to the accompanying drawing, which shows one embodiment thereof, Fig. 1 shows a block diagram of one embodiment of the arrangement according to the invention, the operation of which will be explained with reference to Figs. 2 to 7, which show various voltages occurring in the arrangement as a function of time and Fig. 8 shows part of the arrangement shown in Fig. 1 in a detail view; finally Fig. 9 shows a further embodiment of the arrangement shown in Fig. 8. In the arrangement shown in Fig. 1 the output signal of a camera tube (not shown) is supplied through the conductor 1 to the amplifier 2. The signal across the output of the amplifier 2 is shown in Fig. 2.

Reference numeral 3 designates the reference levels, occurring in this case with line frequency and corresponding to the black level of the image signal; a few signals occurring during line scanning are shown at 4.

Owing to the occurrence of unwanted components the reference levels are not at constant potential.

If it were desired to bring the reference levels in the aforesaid known manner to a constant potential, this could, in general, not be carried out correctly owing to the simultaneous occurrence of noise, which is not indicated herein, since the conventional devices respond mainly to extreme values of the signal to be stabilized, so that not the level 3 but a level differing therefrom by a variable amount owing to noise would be stabilized.

The output signal of the amplifier 2 is supplied to a mixing stage 5 and to a mixing stage 6, both of which may be of known kind, for example, a pair of tubes to the grids of which the respective signals are fed, the anodes of these tubes being connected together to provide a single mixed output signal. To the mixing stage 5 is supplied at 7 a pulsatory signal of the form shown in Fig. 3. This signal contains negative-going pulses 8 of the same repetition frequency as that of the reference levels 3 of Fig. 2 and the pulses 8 occur during the last part of the reference levels 3. Various suitable means for producing these pulses will be apparent to persons skilled in the art.

The output signal of the mixing stage 5 is supplied via the conductor 9 to the separating stage (clipper) 10. The output signal of the mixing stage 5 is indicated in Fig. 4, the pulses being positive-going and the image signal being negative-going. It should be noted that the polarity of the output signal of the various stages of the arrangement shown in Fig. 1 depends upon the nature of the circuits employed and that, if desired, the polarity may be reversed in known manner, for example with the aid of a further amplifier.

In the signal shown in Fig. 4 the pulses are superimposed on the reference levels 3, so that the variation of the positions of levels 3 corresponds with the variation of the positions of the peaks of pulses 8. The separation device 10 allows only signals to pass, the amplitude of which exceeds a value indicated by the broken line II—II of Fig. 4. It should be noted that it may therefore be of advantage to choose the amplitude of the pulses 8 comparatively high, so that the level 11 may be kept at a high potential and there is no risk for this level to drop below the reference levels 3. The signal occurring across the output of the separation stage 10, shown again in Fig. 5, is supplied through the conductor 12 to an integrating device 13, which is shown partly in detail in Fig. 8. To this device, through the conductor 14, are supplied pulses 15, which have the same periodicity as the pulses 8. This pulsatory signal 15 is shown in Fig. 6. As is evident from a comparison between Figs. 5 and 6, the polarity of the pulses 15 is opposite the polarity of the pulses 8 and the pulses 15 terminate at the instant when the leading edge of the pulses 8 occurs. Various well-known means for producing these pulses will be apparent to persons skilled in the art.

The pulses 8 shown in Fig. 5 are supplied to the control-grid 16 of the tube 17 in the circuit arrangement shown in Fig. 8, whilst the pulses 15 shown in Fig. 6 are fed to the control-grid 18 of the tube 19. The anode circuit of the tube 19 includes the resistor 20. The anode of tube 19 is furthermore connected to the anode of the diode 21, the cathode of which is coupled with the anode of tube 17. Between this anode and earth provision is made of a capacitor 22. The anode of tube 17 is also connected to the anode of the diode 23 and between the cathode of this diode and earth provision is made of the parallel combination of a resistor 24 and a capacitor 25, this combination having a high time constant. The cathode 26 of the diode 23 is kept at constant potential by way of the resistor 27.

As long as tube 19 is conductive, such a voltage drop occurs across resistor 20 that no current flows through the charging circuit of capacitor 22, this circuit including resistor 20 and diode 21.

If at the control-grid 18 of tube 19 occurs a pulse 15, the tube 19 becomes nonconductive, so that the voltage at the anode of tube 19 increases and a charging current begins to flow across capacitor 22 through resistor 20 and diode 21. The capacitor 22 is then charged to a voltage corresponding to the potential of the cathode 26 of the diode 23. In order to avoid that at the occurrence of the charging current pulse also the potential of the cathode 26 would vary, the capacitor 25 having a high capacity is provided.

The voltage variations at capacitor 22 are shown in Fig. 7.

It is evident therefrom that at the occurrence of a pulse 15 the voltage across the capacitor increases always to the same constant value, indicated by the level 28, which is thus equal to the potential of the cathode 26 of the diode 23.

Immediately at the termination of the pulse 15, the control-grid 16 of the tube 17 has produced at it a pulse 8, so that the capacitor 22 is discharged through tube 17 for an amount of charge determined by the amplitude of the pulse 8, shown in Fig. 5.

It should be noted that at this discharge the potential of the anode 17 and hence that of the cathode of the diode 21 drops, but that this diode 21 remains inconductive, since the tube 19 is then conductive, so that the potential of the anode of diode 21 is lower than the potential of the cathode of the diode.

The level occurring subsequent to the partial discharge of capacitor 22 is indicated at 29 in Fig. 7. Then a pulse 15 re-occurs and the capacitor voltage increases to a level 28 and then, at the occurrence of the second pulse 8 having a smaller amplitude than the preceding pulse 8 it decreases to a level 30, which is higher than the level 29.

If the lever 3 of Fig. 2 had also noise, this noise would also occur in the amplitude of the pulses 8 shown in Figs. 4 and 5, so that also the discharge current of capacitor 22 would show fluctuations during a pulse 8. However, this noise occurs integrated in the voltage variation of the capacitor and hence this capacitor voltage is not determined by an accidental maximum noise component, as is the case in peak detection devices.

Since the capacitor 22, as long as no pulse 15 occurs, is substantially insulated, it is avoided that the capacitor voltage drops exponentially, as is the case with most detection circuits, in which a resistor is connected in parallel with the capacitor.

With the voltage variation shown in Fig. 7 the levels 29, 30 and so on vary in a manner corresponding with the variation of the positions of the reference levels in the voltage shown in Fig. 2.

By reversing in known manner the polarity of the voltage shown in Fig. 7 and by using such an amplification that the variation has the same amplitude as that shown in Fig. 2, a mixing of the signals shown in Figs. 2 and 7 yields an output signal in which the reference levels 3 are on a constant level, which is substantially not affected by noise.

To this end the output signal of the device 13 of Fig. 1, which is amplified and reversed in polarity in the known manner, is supplied through the conductor 31 to the mixing stage 6, to which, as described above, the signal shown in Fig. 2, which occurs across the output of the amplifier 2, is supplied through the conductor 32.

From the output circuit 33 of the device 6 the desired signal is derived.

It should be noted that in Figs. 5 and 6 it is indicated for the sake of simplicity that the trailing edge of the pulses 15 coincides with the leading edge of the pulses 8. This, however, is not necessary, since the leading edge of pulse 8 may occur earlier than the trailing edge of pulse 15, so that for example the duration of the pulses 8 may be chosen equal to the duration of the reference level 3 shown in Fig. 2.

It is moreover not necessary that in the arrangement shown in Fig. 8 the diode 23, the resistors 24 and 27 and the capacitor 25 should be used. If the increases in voltage across capacitor 22, at the occurrence of each pulse 15, is constant, the potential difference between the levels 29 and 30 of Fig. 7 will nevertheless have the correct value.

In the arrangment shown in Fig. 9 the signal of Fig. 5 to be integrated is fed to the control grid of the tube 34, the anode circuit of which includes the capacitor 35. The charging circuit of capacitor 35 includes the tube 36. To the control-grid of this tube is applied a constant voltage with the aid of the potentiometer 37, 38 and the resistor 39. Moreover, through capacitor 40 a pulsatory signal is supplied to this control-grid. This pulsatory signal has the same form as that shown in Fig. 6, but it has opposite polarity. By suitable choice of the bias voltage at the control-grid and of the amplitude of the pulses 15, it is ensured that the tube 36 is conductive only during the pulses 15 and that the capacitor 35 is charged. At the occurrence of a pulse 8 at the control-grid of the tube 34, the capacitor 35 is discharged to a value determined by the amplitude of the pulses 8.

The output signal is derived from the capacitor 35.

What is claimed is:

1. A circuit arrangement for reducing the effect of unwanted components in a television signal which contains a reference level corresponding to a constant voltage level during periodical time intervals, comprising a source of said television signal, a source for producing a periodical pulsatory signal of constant amplitude occurring during only at least part of said time intervals, a mixing stage connected to combine said signals whereby said pulsatory signals are added to said reference level, a clipper circuit for separating at least a portion of said added signals from the remainder of said combined signals, integrator means connected to integrate the separated portion of said added signals, and means for combining the integrated signal with said television signal in phase opposition to said unwanted components.

2. A circuit arrangement as claimed in claim 1, in which said integrator means comprises a capacitor, means for periodically charging said capacitor to a definite voltage, means connected to partially discharge said capacitor only during the occurrence of said separated portion of the added signals and by an amount determined by the amplitude of said separated portion of the added signals, and means for deriving said integrated signal from said capacitor.

3. A circuit arrangement as claimed in claim 2, in which said means to partially discharge said capacitor comprises an amplifier tube having a control electrode and output electrodes, means for feeding said separated portion of the added signals to said control electrode, and means connecting said output electrodes substantially across said capacitor, and in which said means for periodically charging said capacitor comprises a second amplifier tube having an input electrode and an output electrode, a source of positive potential, a resistor connected between said last-named source and said anode, a rectifier connected between said anode and a terminal of said capacitor, and a source of pulses connected to said input electrode to periodically cut off said second amplifier tube with the same periodicity as said time intervals and to render said second amplifier tube conductive during at least part of the time duration of said separated portion of the added signals.

4. A circuit arrangement as claimed in claim 2, in which said means to partially discharge said capacitor comprises an amplifier tube having a control electrode and output electrodes, means for feeding said separated portion of the added signals to said control electrode, and means connecting said output electrodes substantially across said capacitor, and in which said means for periodically charging said capacitor comprises a source of charging voltage, a switching means connected in series combination with said capacitor across said source of charging voltage, and a source of pulses connected to said switching means to periodically close said switching means with the same periodicity as said time intervals and to open said switching means during at least part of the time duration of said separated portion of the added signals.

References Cited in the file of this patent

UNITED STATES PATENTS 2,241,553 Kallmann et al. -------- May 13, 1941